(12) United States Patent
Deng et al.

(10) Patent No.: US 10,958,754 B2
(45) Date of Patent: Mar. 23, 2021

(54) METHOD, APPARATUS, MEDIUM AND SYSTEM FOR CACHING DATA

(71) Applicant: NOKIA SOLUTIONS AND NETWORKS OY, Espoo (FI)

(72) Inventors: Chun Lu Deng, Beijing (CN); Zhe Yuan, Beijing (CN); Shao He Wu, Beijing (CN); Wu Lun Cui, Beijing (CN); Hong Yan Guo, Beijing (CN); Kui Liang Li, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/604,022

(22) PCT Filed: Apr. 10, 2017

(86) PCT No.: PCT/EP2017/058572
§ 371 (c)(1),
(2) Date: Oct. 9, 2019

(87) PCT Pub. No.: WO2018/188727
PCT Pub. Date: Oct. 18, 2018

(65) Prior Publication Data
US 2020/0389538 A1 Dec. 10, 2020

(51) Int. Cl.
*H04L 29/08* (2006.01)
(52) U.S. Cl.
CPC .............................. *H04L 67/2842* (2013.01)

(58) Field of Classification Search
CPC ........ H04L 67/2842; H04L 67/1042–67/1097; G06F 12/0802–12/0875
See application file for complete search history.

(56) References Cited

U.S. PATENT DOCUMENTS 7,010,578 B1 3/2006 Lewin et al.
2010/0138485 A1 6/2010 Chow et al.

FOREIGN PATENT DOCUMENTS

EP 2 702 500 A2 3/2014

OTHER PUBLICATIONS

International Search Report & Written Opinion dated Dec. 14, 2017 corresponding to International Patent Application No. PCT/EP2017/058572.

*Primary Examiner* — Clayton R Williams
(74) *Attorney, Agent, or Firm* — Squire Patton Boggs (US) LLP

(57) ABSTRACT

According to an aspect, a method comprises maintaining, by a cache control unit in a first packet data network, white and black lists of data servers in a second packet data network that are allowed or unable to use a cache server in the first packet data network, respectively; monitoring data traffic to and from data servers in the second packet data network over an interface between the first and second packet data network; comparing the candidate data servers to the data servers in the white and black lists; and in response to a candidate data server being in neither list, performing the following: causing sending a cache request to the candidate data server and in response to receiving an acknowledgement to the cache request within a pre-defined time, adding the candidate data server to the white list, otherwise adding the candidate data server to the black list.

14 Claims, 12 Drawing Sheets

METHOD, APPARATUS, MEDIUM AND SYSTEM FOR CACHING DATA

FIELD OF THE INVENTION

The exemplary and non-limiting embodiments of this invention relate generally to wireless communications networks, and more particularly to caching data at a gateway node.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The number of networking devices is increasing rapidly. At the same time, more and more data is transmitted to and/or from user devices over the air. In future 5G mobile networks, throughput of a single cell may, accordingly, be very high, even up to 1 Gbps. One packet data network gateway (PDN gateway, P-GW) providing an exit and entry point for the data traffic to other packet data networks can serve hundreds of cells, often more than one thousand, which necessitates the P-GW to have a very high throughput capability at an interface to the other packet data networks.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise methods, apparatuses, and a computer program product as defined in the independent claims. Further embodiments of the invention are disclosed in the dependent claims.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Figure 1:
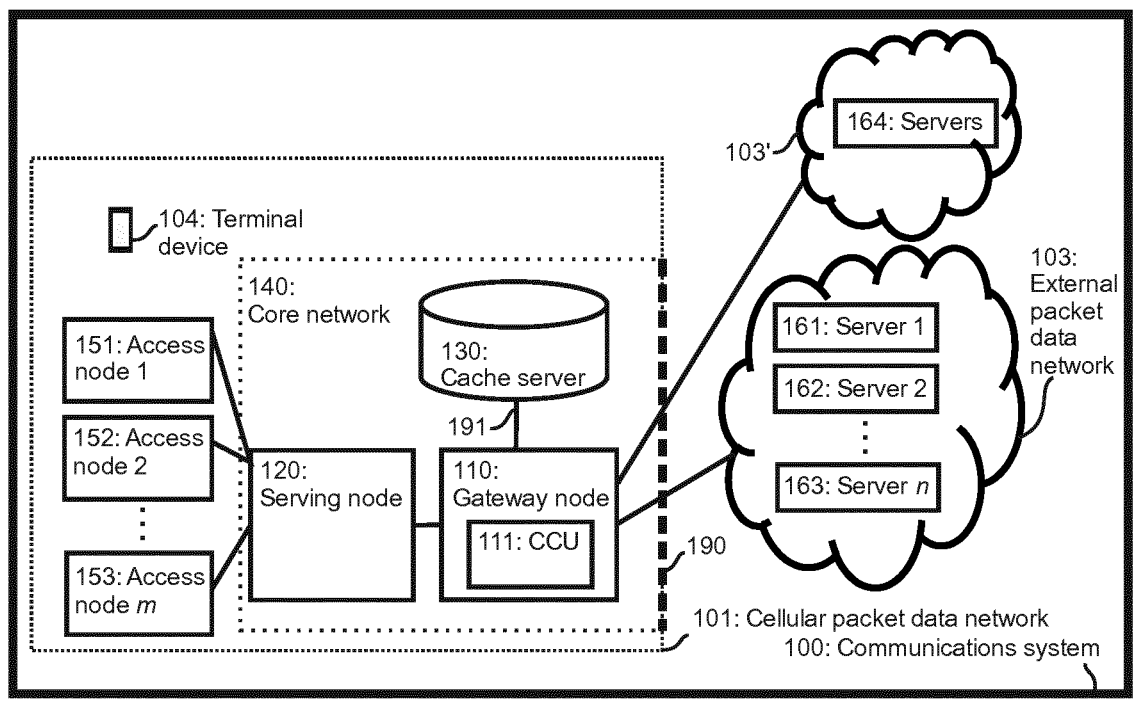
FIG. 1 illustrates an example of a communications system to which embodiments of the invention may be applied.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments described may be implemented in any communications system, such as in at least one of the following: Worldwide Interoperability for Microwave Access (WiMAX), Global System for Mobile communications (GSM, 2G), GSM EDGE radio access Network (GERAN), General Packet Radio Service (GRPS), Universal Mobile Telecommunications System (UMTS, 3G) based on basic wide-band-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communications system.

The embodiments are not, however, restricted to the system given as an example but a person skilled in the art may apply the solution to other communications systems provided with necessary properties. One example of a suitable communications system is the 5G system, as listed above. 5G has been envisaged to use multiple-input-multiple-output (MIMO) multi-antenna transmission techniques, more base stations or nodes than the current network deployments of LTE, by using a so-called small cell concept including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (for example IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cmWave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cmWave and mmWave). One of the concepts considered to be used in 5G networks is network slicing in which multiple independent and dedicated virtual sub networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise, in addition to standard high-volume servers, switches and storage devices, one or more virtual machines running computer program codes using standard or general type servers instead of customized hardware. Cloud computing or cloud data storage may also be utilized. In radio communications, this may mean that node operations are carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1 illustrates an example of a communications system 100 to which embodiments of the invention may be applied. The communications system comprises one or more cellular packet data networks 101 (one illustrated in FIG. 1) and one or more external packet data networks 103, 103' (two illustrated in FIG. 1), connected via a first interface 190. The external packet data networks 103, 103' provide access for the cellular packet data network 101 to a plurality of data servers 161, 162, 163, 164. The cellular packet data network 101 may correspond to, for example, a 3rd generation partnership project (3GPP) network, a network supporting general packet radio service (GRPS), a future 5G communications network or any other cellular packet-based network. The external packet data networks 103, 103' may be, for example, the Internet and/or an X.25 network. While FIG. 1 shows only a single cellular packet data network 101 connected to the external packet data networks 103, 103' for clarity and simplicity, it should be understood that multiple cellular packet data networks may be connected to the external packet data networks 103, 103' and have access to the same data servers 161, 162, 163, 164 therein as illustrated for a single cellular packet data network 101 in FIG. 1.

The cellular packet data network 101 comprises a plurality of access nodes 151, 152, 153 connected to a core network 140. The plurality of access nodes 151, 152, 153 may comprise one or more of the following: an evolved Node B (eNB) as in the LTE and LTE-A, a next generation node B (NGNB), like in 5G, an access point of an IEEE 802.11-based network (Wi-Fi or wireless local area network, WLAN), a radio network controller (RNC) as in the UMTS, a base station controller (BSC) as in the GSM/GERAN, Access Point (AP), or any other apparatus capable of controlling wireless communication and managing wireless resources within a cell. Typically, the wireless communication is radio communication. For 5G solutions, the implementation may be similar to LTE-A, as described above. The access node may equally be called a base station.

The cellular packet data network 101 may further comprise a plurality of terminal devices 104 (of only one is shown in FIG. 1). Terminal devices 104 located within the coverage area of one or more of the plurality of access nodes 151, 152, 153 are able to connect to the core network 140 via the one or more of the plurality of access nodes 151, 152, 153 and via the core network 140 further to the external packet data networks 103, 103' and to the plurality of data servers 161, 162, 163, 164. The terminal device 104 refers to a portable or non-portable computing device (equipment, apparatus). Computing devices (apparatuses) which may be employed include wireless mobile communication devices operating with or without a subscriber identification module (SIM) in hardware or in software, including, but not limited to, the following types of devices: desktop computer, laptop, touch screen computer, mobile phone, smart-phone, personal digital assistant (PDA), handset, e-reading device, tablet, game console, note-book, multimedia device, sensor, actuator, video camera, car, wearable computer, telemetry appliances, and telemonitoring appliances.

The core network 140 may correspond to a general packet radio service (GPRS) core network for 2G or 3G solutions or to a system architecture evolution (SAE) core network or an evolved packet core (EPC) for 4G and 5G solutions. The core network 140 comprises one or more serving nodes 120, one or more gateway nodes 110 and one or more cache servers 130.

The serving node 120 serves the plurality of terminal devices 104 by routing and forwarding the data packets of the terminal devices 104 from the access nodes 151, 152, 153 to the gateway node 110 providing access to the external packet data networks 103, 103' and vice versa. Depending on the core network technology, the service node may also have other functionalities such as logical link management, authentication, acting as a mobility anchor for the user plane during inter-access node handovers or between different technologies and/or managing terminal device contexts. The serving node may correspond to a serving GPRS support node (SGSN) for 3G core networks and to a serving gateway (S-GW) for 4G and 5G EPC networks. In some embodiments, the serving node 120 may be connected to multiple gateway nodes for accessing multiple external packet data networks (not shown in FIG. 1). For example, when the core network 140 corresponds to the EPC, one P-GW may provide access to one or more service PDNs such as the Internet while another P-GW may provide access to an administrative PDN.

The gateway node 110 acts, via the first interface 190, as a gateway between the core network 140 (or equally the cellular packet data network 101) and the one or more external packet data networks 103, 103'. In other words, the gateway node 110 is a node equipped for interfacing with the external packet data network 103, 103' which uses different protocols than the core network 140. Depending on the core network technology, the gateway node may also have other functionalities such as performing policy enforcement, packet filtering, charging support, lawful interception, packet screening and/or acting as an anchor for mobility between different technologies. The gateway node may correspond to a gateway GPRS support node (GGSN) for 3G core networks and to a packet data network (PDN) gateway (P-GW) for 4G and 5G EPC networks. The first interface 190 may correspond to a Gi interface for 3G core networks and a SGi interface for 4G and 5G EPC networks.

The gateway node 110 is connected to a cache server 130 for caching data stored in the data servers 161, 162, 163 accessed through the first interface 190. The cache server 130 may be accessed via the gateway node 110 by the plurality of terminal devices 104 as well as by the plurality of data servers 161, 162, 163. The cache server is controlled by the cache control unit (CCU) 111. How the cache server is used for caching data will be described in more detail below.

In some embodiments, two or more cache servers may be under the control of a single CCU. The two or more cache servers may be connected to the same node (the gateway node 110 or the serving node 120) or to different nodes. The latter options may enable caching not only for the data traffic over the first interface 190 (e.g., a SGi interface in EPC networks) but also for other interfaces such as the interface between the serving node and the gateway node (e.g., S5 interface in EPC networks) or one or more interfaces between the serving node 120 and the access nodes 151, 152, 153 (e.g., S1 interfaces in EPC networks).

Each cache server 130 refers herein to a combination of a data storage (database) and a data management system. The data storage may be any kind of conventional or future data repository, including distributed and/or centralised storing of data, a cloud-based storage in a cloud environment, managed by any suitable data management system. The implementation of the data storage, the manner how data is stored, retrieved and updated are irrelevant to the invention, and therefore not described in detail here.

Each of the external packet data networks 103, 103' comprise a plurality of data servers 161, 162, 163, 164 (depicting a plurality of data servers). The data servers may be accessed by the terminal devices 104 of the cellular packet data network 101 via the first interface 190. Some of the data server may be configured to be able to cache their data to the cache server 130 while others may be incompatible with the cache server 130.

Each the data servers 161, 162, 163, 164 refer herein to a combination of a data storage (database) and a data management system. As above, also herein the data storage of the data server 161, 162, 163, 164 may be any kind of conventional or future data repository, including distributed and/or centralised storing of data, a cloud-based storage in a cloud environment, managed by any suitable data management system. The implementation of the data storage, the manner how data is stored, retrieved and updated are irrelevant to the invention, and therefore not described in detail here.

The decision on which data servers are allowed to use the cache server 130 is made by the CCU 111 based on monitoring the data traffic to and from each data server 161, 162, 163, 164 through the first interface 190. The CCU 111 may also enable/disable the use of the cache server 130 for data servers 161, 162, 163, 164. The CCU 111 is also able to communicate with the data servers 161, 162, 163, 164 via the first interface 190 and also with the cache server 130 via a second interface 191. The detailed operation of the CCU 111 will be described in the following embodiments. In the exemplary cellular packet data network 101 of FIG. 1, the gateway node 110 comprises the CCU 111. In other embodiments, the CCU may be, alternatively, comprised in the cache server 130 or the serving node 120 or it may be a separate entity (e.g., a dedicated computing device) connected to the gateway node 110, the serving node 120 and/or the cache server 130.

In order to be able to perform caching for certain data servers of the external packet data network but not for others, a handshake protocol needs to be supported by the CCU and the data servers. The CCU may use the handshake protocol for communication with the data servers in order to enable or disable the use of the cache server for certain data servers while the data servers may use the handshake protocol in conjunction with the information provided by the CCU to control what data will be cached and which terminal devices are eligible for using the cache. As the data servers using the cache server need to be able to support the handshake protocol which may not be true for all the data servers in the external packet data network, the CCU needs to keep track of the data servers which support the protocol and those which do not. To this end, a white list of data servers and a black list of data servers may be established for servers enabled to use the cache server (and therefore also supporting the handshake protocol) and for servers not supporting or disabled from using the handshake protocol, respectively.

In the following, embodiments where data traffic to and from each data server in an external packet data network, called below second packet data network, is monitored separately and the consequent cache allocating is carried out in communication with the data servers are described in detail in relation to FIGS. 2 to 11. Further, it is assumed that the external packet data network is the Internet or other TCP/IP network using IP addresses.

Figure 2:
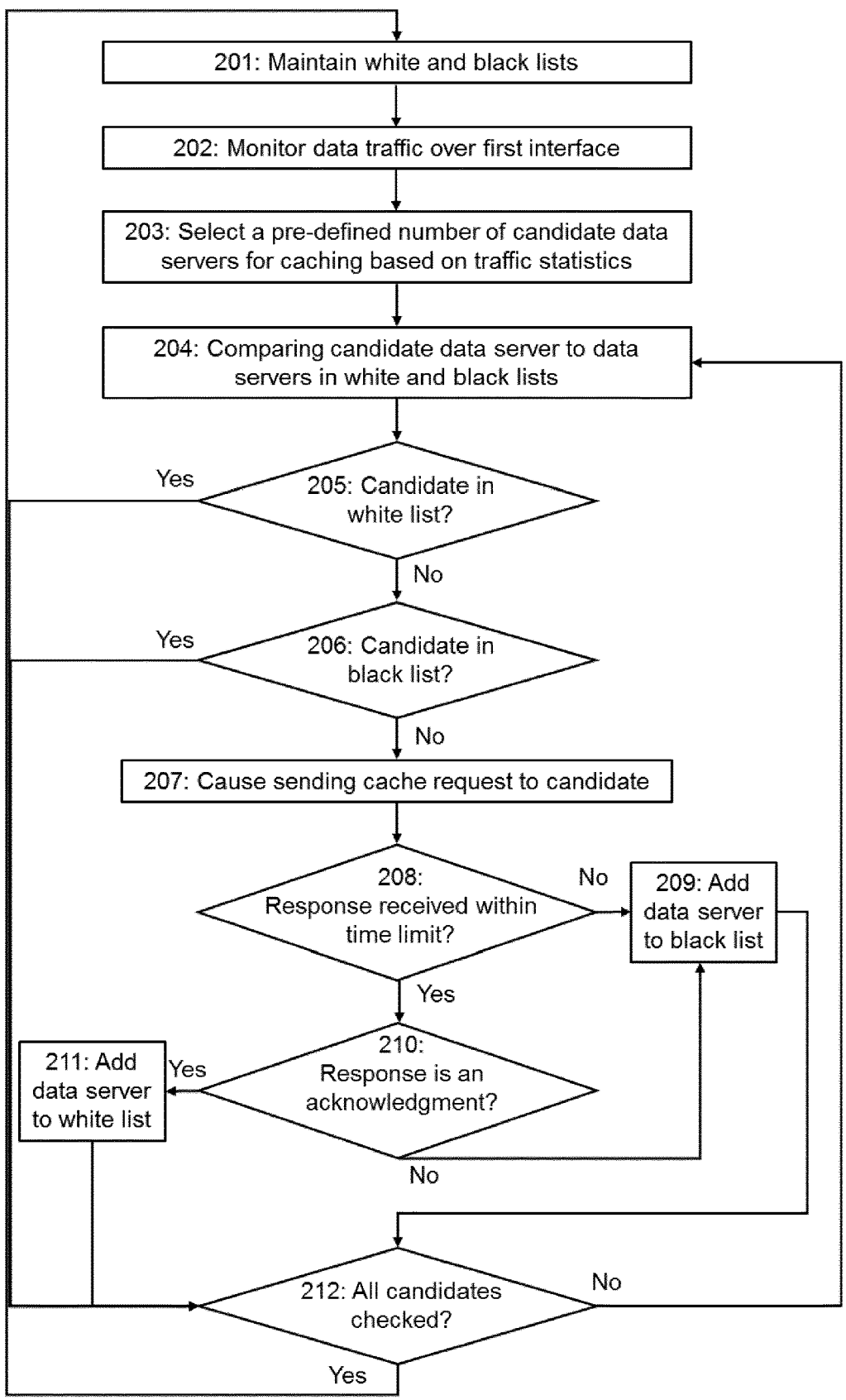
FIGS. 2 to 11 illustrate examples of processes according to embodiments of the invention.

FIG. 2 illustrates a process executed by the CCU in a first packet data network for selecting data servers for caching and enabling caching for said data servers according to an embodiment of the invention. The process of FIG. 2 may be repeated periodically and/or it may be triggered by the CCU at any time. The white and/or black list may also be reset periodically, in which case they/it will be empty when the process is triggered after the reset.

The CCU maintains, in block 201, in a memory a white list for data servers in a second packet data network which are allowed to use the cache server and a black list for data servers in the second packet data network unable to use the cache server. The first and second packet data networks may be the cellular packet data network 101 and the external packet data network 103 or 103', respectively. The CCU monitors, in block 202, data traffic over an interface to each data server accessed in the second packet data network(s) and from each data server accessing the first packet data network. The CCU may monitor the traffic volume to and from each data server or some of data servers in the second packet data network, the traffic volume being a measure for the amount of data transmitted over the first interface over a certain period of time (e.g., 24 hours). Monitoring the traffic volume separately for each data server has the benefit of requiring relatively low computational capability from the CCU. If the second packet data network is the Internet, the monitoring may involve monitoring the traffic volume corresponding to internet protocol (IP) addresses accessed by the terminal devices. In an embodiment, the monitoring may involve monitoring the source IP address of each transmission control protocol (TCP) or user datagram protocol (UDP) stream (corresponding to downlink direction) and the destination IP address of each TCP or UPD stream (corresponding to uplink direction) and the corresponding total traffic volumes for each uplink/downlink IP address.

The CCU selects, in block 203, a pre-defined number of candidate data servers for caching based on one or more data traffic statistics. The basic principle in selecting the data servers to be cached is that the data responsible for high data traffic volumes, for example, data corresponding to popular streaming video content, should be cached to decrease the bandwidth consumption at the first interface as much as possible and therefore to improve quality of service and user experience. The one or more statistical properties of the monitored data traffic may, for example, relate to the fluctuations of traffic volume for each data server or to the amount of times certain content, e.g., a video stream, is accessed within a certain time frame. The pre-defined number may depend on the number of data servers in the white list. For example, a larger number of candidate data servers may be selected if the white list is empty due to the white list having been reset recently.

To determine which of the selected candidate data servers are able and/or willing to use the cache server, the CCU, first, compares, in block 204, a selected candidate data server to data servers in the white and black lists. If it is detected that a candidate data server is neither in the white nor in the black list (blocks 205 and 206), the CCU causes, in block 207, sending a cache request to the candidate data server using the handshake protocol. The cache request may comprise information on the cache server and routing information. In an embodiment, the information on the cache server comprises an IP address of the cache server and/or an IP address of a CCU controlling the cache server and/or caching data type and/or file path information and/or a cache space quotation and the routing information comprises at least an IP prefix list of IP4 and/or IP6 prefixes associated with the cache server to be used by the data server for determining which terminal devices are able to access the cache server. The cache space quotation comprises at least information on cache space available in the cache server. The cache request may further comprise information on whether access information is needed to gain access to the cache server. If the CCU receives, in block 208, a response to the cache request and the response is an acknowledgment, i.e., a positive response, the CCU adds, in block 211, the data server to the white list. If, on the other hand, the response is a negative response (block 210) or no response is received within the pre-defined time (block 208), the CCU adds, in block 209, the data server to the black list.

After the candidate has been added either to the white or the black list, it is again checked (block 212) whether all the candidate data servers have been compared to the white and black lists. If this is not the case, the CCU continues comparing in block 204.

If it is detected that the candidate data server is in the white list or the black list (blocks 205 and 206), the process proceeds to check (block 212), whether all the candidate data servers have been compared to the data servers in the white and black lists.

If all the candidate data servers have been checked (block 212), the CCU returns to normal operation (to block 201).

Figure 3:
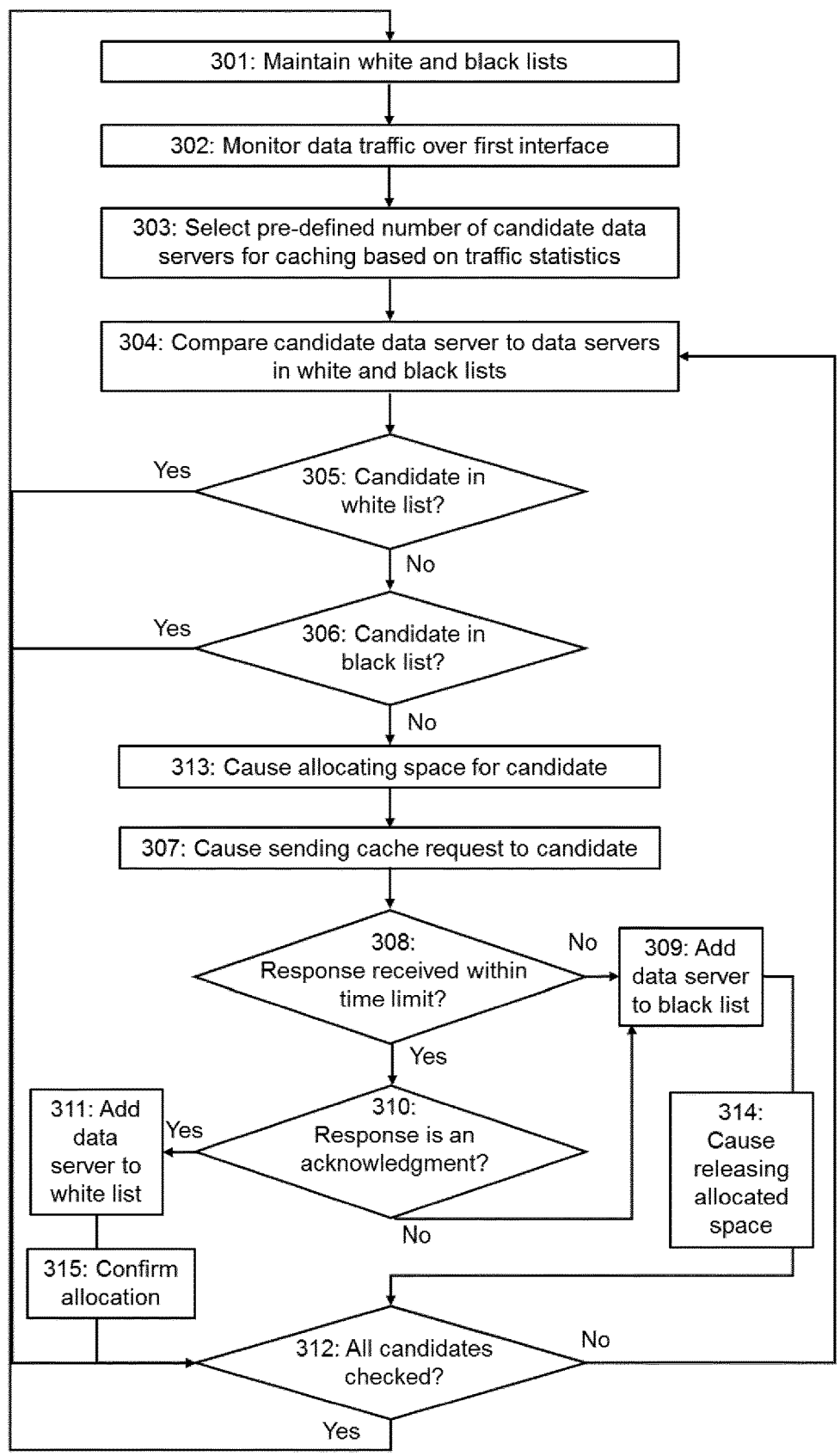

In the process illustrated in FIG. 2, the CCU chose a set of data servers for caching based on monitored data traffic excluding data servers unable to use the cache serve. However, the process of FIG. 2 did not describe how the cache space would be allocated. A process executed by the CCU which includes also the cache space allocation according to an embodiment is illustrated in FIG. 3. The process is for the most part the same as the process illustrated in FIG. 2. As blocks 201 to 212 correspond to blocks 301 to 312, respectively, the only difference between the two processes is the inclusion of blocks 313, 314 and 315 related to cache space allocation. For that reason, the description of the process of FIG. 3 will be limited to the aforementioned blocks related cache space allocation for brevity. In describing the following embodiments, the terms "cellular packet data network" and "external packet data network" will be used instead of "first packet data network" and "second packet data network" for clarity, respectively.

Referring to FIG. 3, after it is determined that a data server is neither in the white list nor in the black list, the CCU causes, in block 313, allocating preliminary cache space for the candidate data server. The allocation may involve communication between the CCU and the cache server. The allocated preliminary cache space may have a pre-defined value (e.g., in kilobytes) or a value dependent on the monitored data traffic to and/or from the data server. For example, if a particular candidate data server is responsible for much larger traffic volumes than the other candidate data servers, more space may be allocated to that particular data server compared to the other candidate data servers. The cache space allocation is considered only preliminary at this point as the data server in question may, in fact, not be able to use the cache server due to not supporting the handshake protocol or supporting the handshake protocol but being configured not to use cache servers. If this is the case, the CCU adds, in block 309, the data server to the black list (similar to process of FIG. 2) and consequently releases, in block 314, the allocated space. If, on the other hand, the CCU adds, in block 311, the data server to the white list, the CCU causes, in block 315, sending a cache allocation confirmation to the cache server. It should be appreciated that the CCU only causes allocating cache space to data servers while the decision on which data to cache is left to the individual data servers.

Some of the data servers may be in the white list already when the process of FIG. 3 is started and therefore cache space is already allocated for them. Therefore, if the process is repeated periodically, the amount of allocated cache space increases until no space is available. For this reason, the CCU should not only be able to perform handshaking with data servers to enable the use of the cache server but also to release data servers from using the cache server if the traffic volumes corresponding to said data servers decrease considerably relative to the other data servers to free up cache space. If such a decrease occurs, the corresponding data server may no longer be chosen in block 203 of FIG. 2 or block 303 of FIG. 3 as a candidate data server when the process of FIG. 2 or 3 is repeated. However, the data server still remains in the white list and is able to use the cache server unless the CCU releases the data server from caching in a cache release process.

As can be seen from FIGS. 2 and 3, determining the candidates for caching based on monitored amount of data traffic does not use much computing capacity and is a rather fast process. In an alternative approach, the CCU could be configured to monitor data content specific to each data bearer. This alternative approach is easier to deploy compared to the above disclosed approach which uses the handshake protocol to inform data servers of cache servers as there are no requirements for the data servers of the external packet data network to be configured to support the handshake protocol. However, in the alternative approach higher requirements for the computational capability of the CCU are imposed due to the requirement to analyze the content of packets. Moreover, monitoring the content may present problems in terms of data security and privacy.

Figure 4:
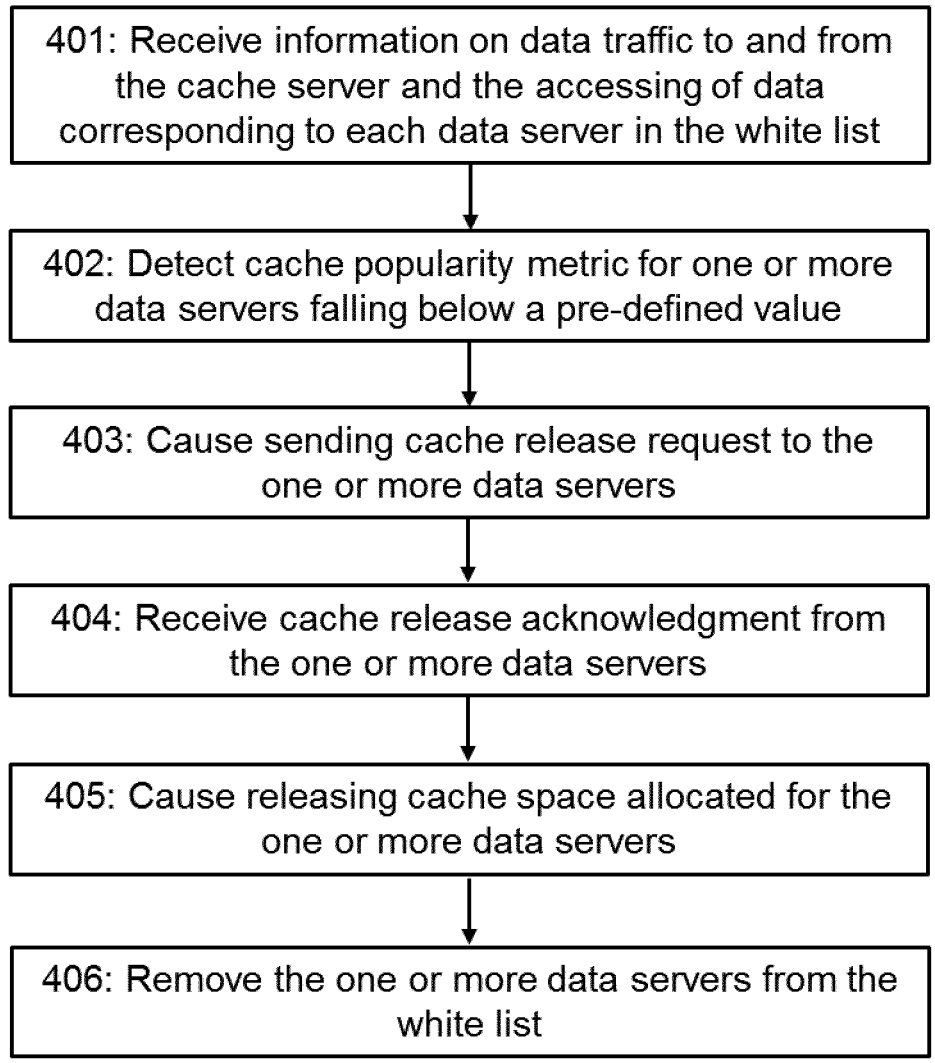
Figure 5:
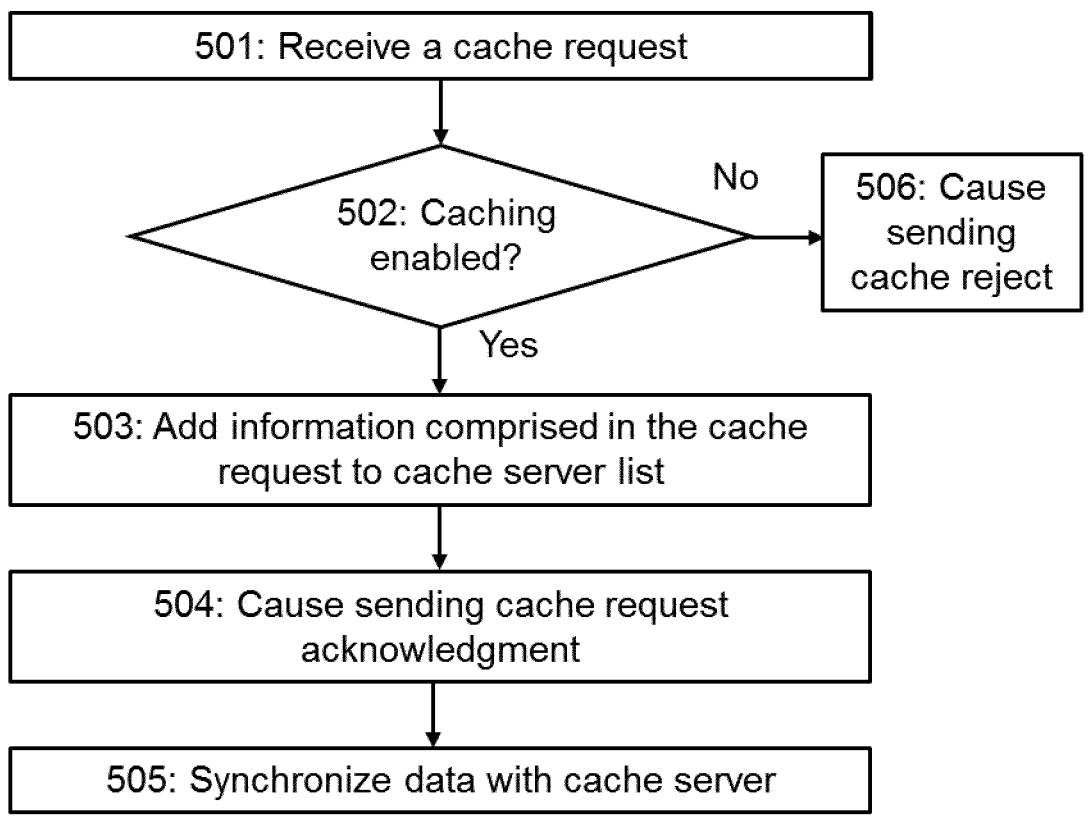

An example of a cache release process executed by the CCU is illustrated in FIG. 4. The CCU receives, in block 401, from the cache server information on data traffic (e.g., traffic volume) to and from the cache server and the accessing of data corresponding to each data server in the white list. The CCU detects, in block 402, a cached data popularity metric for one or more data servers falling below a pre-defined value based on the received information. The cached data popularity metric is calculated for each data server which has cached its data to the cache server. The cached data popularity metric for each data server may relate to, for example, number of times data cached by the data server is accessed in the cache server within a pre-defined time and/or traffic volume caused by data cached by the data server in the cache server. The CCU causes, in block 403, sending a cache release request to the one or more data servers. Upon receiving, in block 404, a cache release acknowledgement from the one or more data servers, the CCU causes, in block 405, releasing cache space allocated for the one or more data servers in the cache server and removing, in block 406, IP of the one or more data servers from the white list. It should be appreciated that since the one or more data servers are not added to the black list, they may be granted permission by the CCU to use the cache server again if the data traffic corresponding to any of the one or more data servers increases relative to the other data servers such that the data server is added to the white list in the process of FIG. 2 or FIG. 3. The cache space allocated for a data server may also be released, even if no cache release acknowledgment has been received, after a pre-defined amount of time has passed. In some embodiments, the cache release process may be integrated into the process of FIG. 3.

In some embodiments, instead of, or in addition to, the cached data popularity metric for one or more data servers falling below a pre-defined value based on the received information in block 402, the CCU may be configured to detect when number of data servers in the white list exceeds a pre-defined value or when available cache space in the cache server falls below a pre-defined threshold value and to cause, in block 403, sending the cache release request to one or more data servers based on one or more statistical properties of the monitored cache data traffic such that the pre-defined value for the number of data servers in the white list is reached or the available cache space increases to reach the pre-defined threshold.

As described above, the data server needs to be configured to support the handshake protocol in order to be able to use a cache server of a cellular packet data network. When the CCU causes sending the cache request to a data server in block 207 or 307 as part of the handshaking procedure, the data server carries out the process illustrated in FIG. 5. The data server receives, in block 501, a cache request from the CCU via the external packet data network. If the data server supports the handshake protocol and is allowed to use caching (block 502), the data server adds, in block 503, information comprised in the cache request (as defined above) to a cache server list maintained in a memory of the data server and causes, in block 504, sending a cache acknowledgment message to the CCU. The cache server list comprises information comprised in the cache request on all the cache servers which have "shaken hands" with the data server (or to be precise, the CCUs of which have "shaken hands" with the data server). The cache server list may also comprise information on CCUs wherefrom the cache request was received. As the cache request contained information on the cache server such as IP address, caching data type and file path information, it is now possible for the data server to synchronize, in block 505, some or all of its data with the cache server, depending on the amount of data in the data server and the space allocated for the data server in the cache server. The data server may cache more data at any time thereafter as long as the allocated cache space quota is not exceeded and it is still in the white list, that is, its permission to use the cache server has not been revoked by CCU. The data server may also request data to be removed from the cache server at any time. If the data server supports the handshake protocol but is configured not to use caching (block 502), the data server causes, in block 506, sending a rejection message to the CCU. Obviously, if the data server does not support the handshake protocol, it may not send any message back to the CCU. In such instances, handshaking is deemed to be a failure when a pre-defined time has passed, as described above.

In some embodiments, the data server may monitor which content is accessed in the data server and the cache server by the terminal devices of the cellular packet data network and how frequently each content is accessed and perform statistical analysis based on the monitoring. Based on the statistical analysis, the data server may favor the more popular content in caching to get the greatest benefit from the limited cache space allocated for the data server in the cache server. The data server may monitor the cache server by monitoring which access request from terminal devices are forwarded to the cache server.

Figure 6:
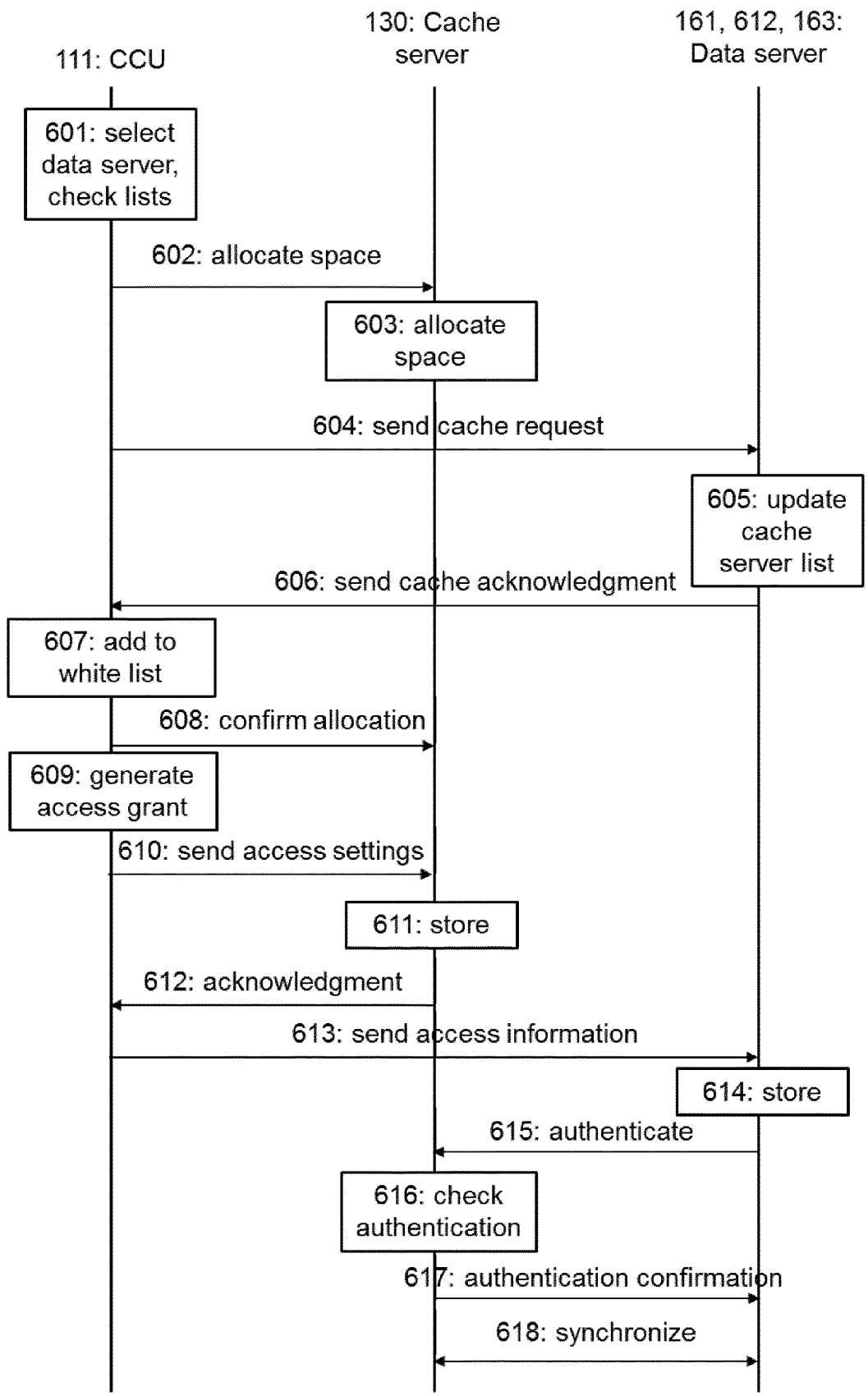

In order to ensure that only the data servers which have been given caching permission by the CCU are using the cache server, it may be necessary or at least beneficial to execute an authentication process between the data server and the cache server before allowing the data server to use the cache server. FIG. 6 presents a signaling diagram illustrating this authentication process as well as the preceding communication performed by the CCU, cache server and a data server according to an embodiment. Apart from the authentication procedure, FIG. 6 corresponds to processes illustrated in FIGS. 3 and 5 for the CCU and the data server, respectively. It is assumed that the CCU maintains a white list and a black list in a memory and monitors the data traffic over an interface, similar to the above embodiments, and has already selected a pre-defined number of candidate data servers for potential handshaking and consequent caching.

Referring to FIG. 6, the CCU selects, in block 601, a candidate data server and checks, in block 601, whether the candidate data server is in the white or black list. It is assumed here that the data server is not in either list. Therefore, the CCU causes sending a cache space allocation request (message 602) to the cache server. The cache server receives the cache space allocation message and, accordingly, allocates, in block 603, space for the candidate data server. The cache server may also cause sending a cache space acknowledgment to the CCU after the allocation (not shown in FIG. 6). Thereafter, the CCU causes sending a cache request (message 604) to the data server. The cache request may comprise information as described in relation FIG. 2. In addition, the cache request may comprise information on whether access information (e.g., a user name and a password) is needed to gain access to the cache server. The information may be given by one byte. For example, the byte being "on" indicates that the access information is needed, whereas the byte being "off" indicates that the access information is not needed. However, any other way of providing the corresponding information may be used. Further, it should be appreciated that there may be implementations in which the access information is always or never needed, in which case no information indicating whether or not the access information is needed is necessary. In this example, access information is needed.

Upon receiving the cache request, the data server updates, in block 605, a cache server list with the information comprised in the cache request and causes sending a cache request acknowledgment in message 606. Upon receiving the cache space acknowledgment, the CCU adds, in block 607, the data server to the white list and causes sending an allocation confirmation (message 608). The cache server may cause sending an acknowledgment to the CCU after receiving the allocation confirmation (not shown in FIG. 6). The CCU generates, in block 609, access information for the data server for accessing the cache server. The access information may comprise one or more user name and password pairs, for example, a user name and a password for reading data in the cache server and/or writing data to the cache server, and/or one or more access tokens and/or any other information needed by the data server to gain access to the cache server using any access control mechanism. The user name and password pairs may be the same or different for reading and writing. The CCU causes sending access settings of the data server (message 610) to the cache server. The access settings comprise the access information, IP address of the data server and other relevant information on the data server. Upon receiving the access settings, the cache server stores, in block 612, the access settings to a memory and causes sending an acknowledgment back to the CCU in message 612. The CCU also causes sending the access information (message 613) to the data server which consequently stores, in block 614, the information to a memory. Then, as both the cache server and the data server have been informed of the access information corresponding to the data server, the data server may at any time cause sending an authentication request (message 615) comprising the access information (e.g., a user name and a password) to the cache server. Upon receiving the authentication request, the cache server checks, in block 616, whether the provided access information and the IP of the data server which sent the authentication request match the access settings of the data server stored in the cache server. If there is a positive match, the cache server causes sending an authentication confirmation (message 617) to the data server. In response to receiving the confirmation, the data server may start synchronizing its data with the cache server (messages 618). If the authentication fails for any reason, the cache server may cause sending an error message to the data server and/or CCU. The CCU may be configured to cause resending the access information to the data server in such cases.

It should be appreciated that if the CCU later selects the data server with the access information to be removed from the white list, that is, to be denied from using the cache server, as illustrated in FIG. 4, the access information corresponding to the data server should also be invalidated by the CCU.

In other embodiments, the data sent by the CCU to the data server via messages 604 and 612 may be distributed in different ways between the two messages. For example, the access information may already be included in the cache request (message 604) in which case the later message (message 610) may act simply as an acknowledgment telling the data server that the cache server has been informed of the access information and therefore the data server may proceed with the authentication (message 615). Moreover, while the above embodiments used user name and password assigned to the data server for authentication, any suitable mature authentication scheme may be used instead. For example, access tokens may be used.

As described above, the cache request may comprise information on whether access information is needed in order to gain access to the cache server (message 604). If access information is not needed, the CCU does not have to generate the access information (block 609) or share the access information with the data server (message 613) but the IP address of the data server may be sent to the cache server and stored to the memory by the cache server, instead of the full access settings, and an acknowledgment may be sent by the cache server to the CCU (message 610, block 611 and message 612, respectively). In this case, simple access control may be conducted, in block 616, by comparing the IP address of the data server from which the authentication message (message 615) came and the IP addresses of the data servers stored to the memory of the cache server. If a match is found, the cache server causes sending an authentication confirmation in message 617 as described above. The authentication confirmation may act as a permission for the data server to start synchronizing data in the data sever with the cache server.

Figure 7:
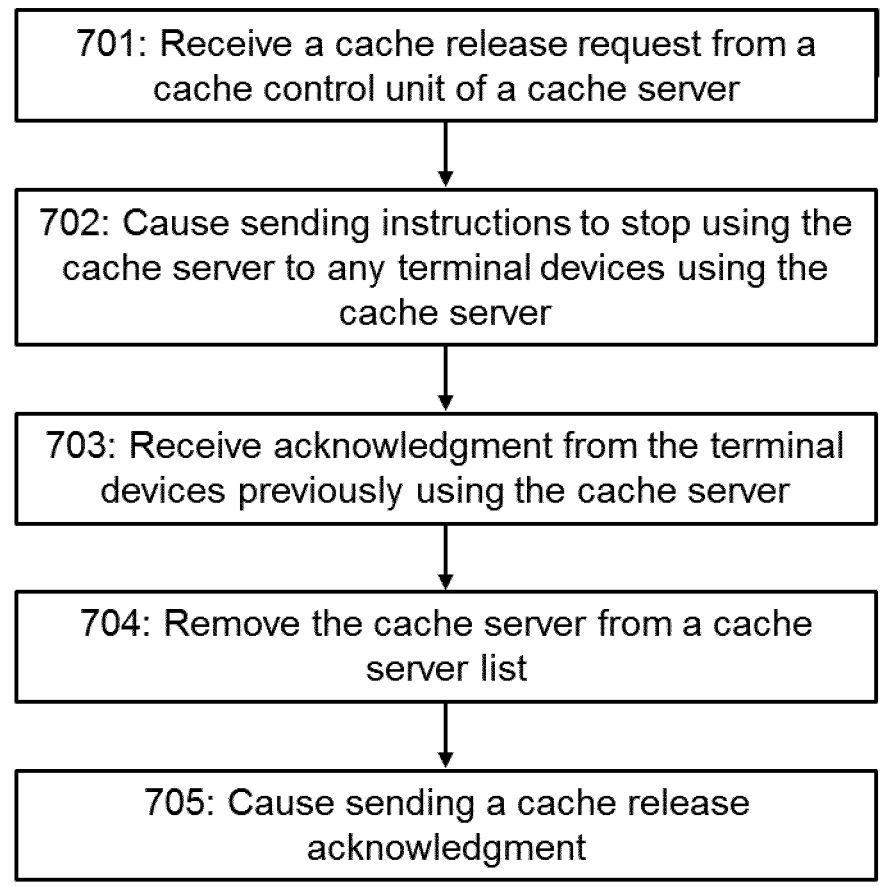

FIG. 7 illustrates a process carried out by a data server which is instructed by the CCU to release the use of the cache server. Upon receiving, in block 701, a cache release request from the CCU, the data server causes, in block 702, sending instructions to stop using the cache server and start accessing data in the data server to the terminal devices which have been instructed by the data server to use the cache server recently. Upon receiving, in block 703, acknowledgments confirming the switch to using the data server instead of the cache server from said terminal devices, the data server removes, in block 704, information related to the cache server from a cache server list of the data server and causes, in block 705, sending a cache release acknowledgment to the CCU. While in the embodiments illustrated in FIGS. 5 and 7, the CCU causes removing the cached data relating to the data server in question from the cache server, in some embodiments, the data server may communicate with the cache server for removing the cached data before removing the information from the cache server list instead.

Figure 8:
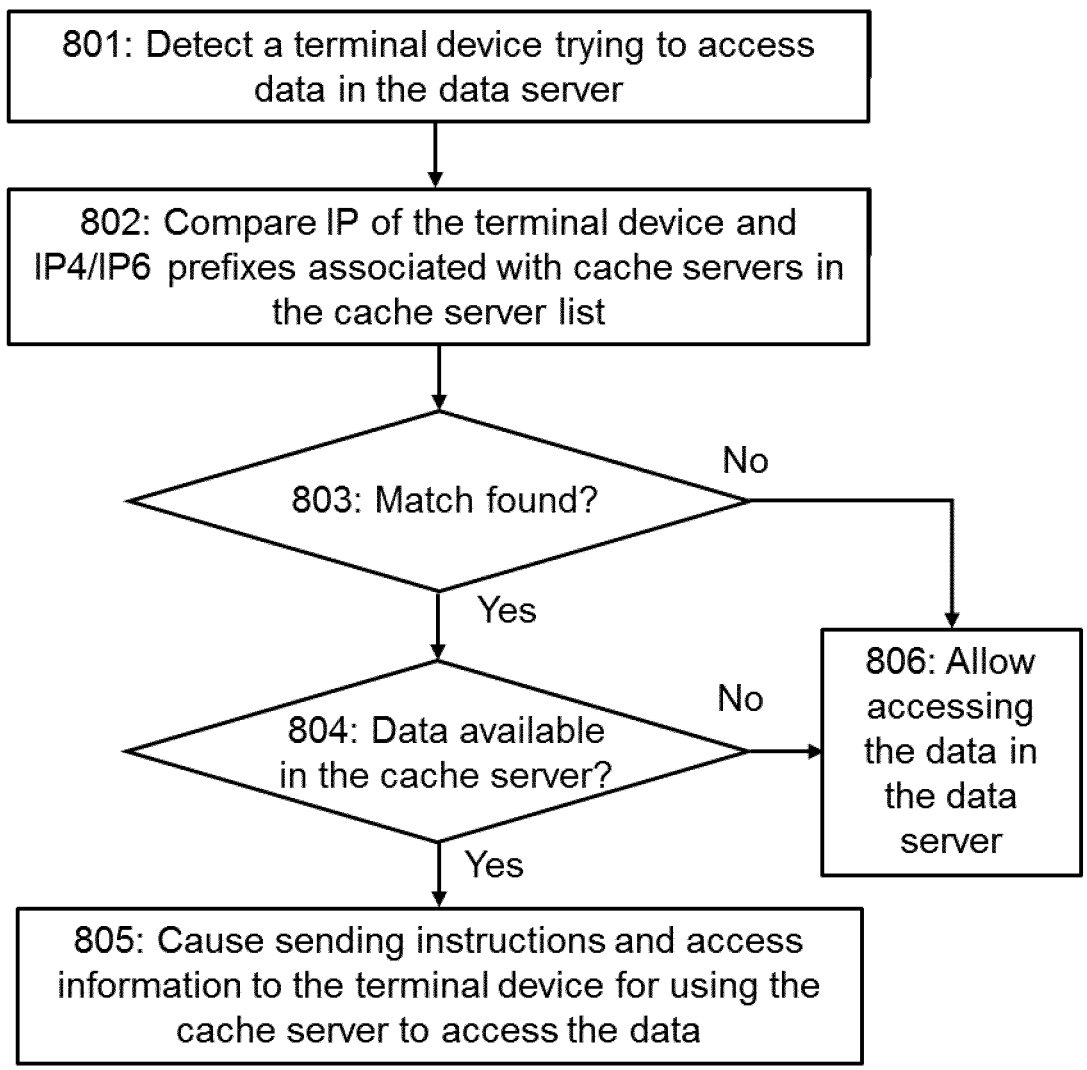

Once space in the cache server has been allocated by the CCU for the data comprised in the data server and some or all of said data have been cached to the cache server, the data server may take advantage of the cached data using the process illustrated in FIG. 8. It is assumed that the data server maintains a cache server list comprising IP prefix lists of each cache server in the cache server list as described in relation to above embodiments. The data server detects, in block 801, that a terminal device is trying to access data in the data server. In response to the detecting, the data server compares, in block 802, a routing IP address of the terminal device accessing the data in the data server to the IP prefix lists of IP4 and/or IP6 prefixes associated with each cache server in the cache server list to determine whether a cache server exists in the cellular packet data network serving the terminal device that is accessing the data in the data server. If a prefix of the routing IP address can be found in the IP prefix list (block 803) and if the data accessed by the terminal device is available in a cache server associated with the IP prefix (block 804), the data server causes, in block 805, sending instructions for accessing the cached data to the terminal device along with the access information (e.g., a user name and a password or an access token) of the cache server if authentication is needed.

If the prefix of the routing IP address cannot be found (block 803) in the IP prefix list or if such a cache server is found but the data is not available in the associated cache server (block 804), the data server allows, in block 806, the terminal device to access the data in the data server.

Figure 9:
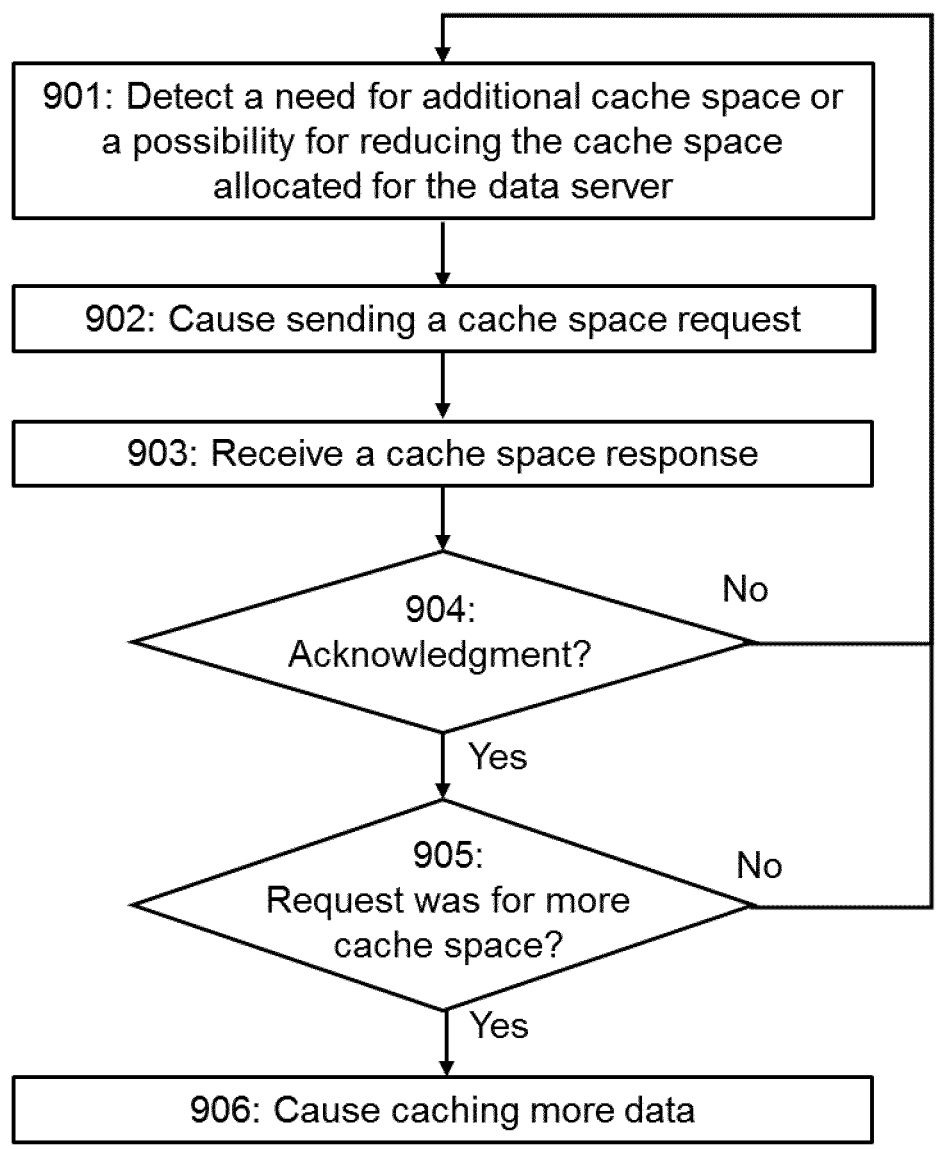

If more space than what was initially allocated for a data server is needed by the data server, the data server may initiate the cache space negotiation process of FIG. 9. The data server may also initiate the cache space negotiation process of FIG. 9 if the amount of cache space allocated for the data server is unnecessarily large. For example, the data server may, first, request additional space due to a sudden spike in increased traffic volumes (e.g., due to a video stream going "viral") and after the traffic volumes decrease to normal levels, the data server may release the additional space. The corresponding process from the point of view of the CCU is illustrated in FIG. 10.

Referring to FIG. 9, the data server detects, in block 901, a need for additional space in a cache server or a possibility for reducing the space allocated for the data server in the cache server. For example, the data server may detect that despite of the caching large data traffic volumes are being downloaded from the data server itself leading to a reduced quality of service or that previously requested additional cache space is no longer needed. In response to the detecting a change in cache space need, the data server causes, in block 902, sending a caching space request to a CCU connected to the cache server. The cache space request may comprise information on how much additional space is needed by the data server or how much space may be released in the cache server. In some embodiments, the cache space request may also comprise information on data server traffic. The CCU may use the information for evaluating the need for additional cache space or whether releasing the cache space is necessary. The data server receives, in block 903, a cache space response from the CCU. If the cache space response corresponds to a cache space acknowledgment (block 904) and the request was for more cache space (block 905), the data server causes, in block 906, caching further data to the additional space allocated for the data server in the cache server. The cache space acknowledgment may comprise information on the amount of additional space allocated to the data server. If the response corresponds to a cache space reject from the CCU or if the response corresponds to an acknowledgment for a request of releasing cache space, the data server continues normal operation with the current or lowered allocated cache server space.

Figure 10:
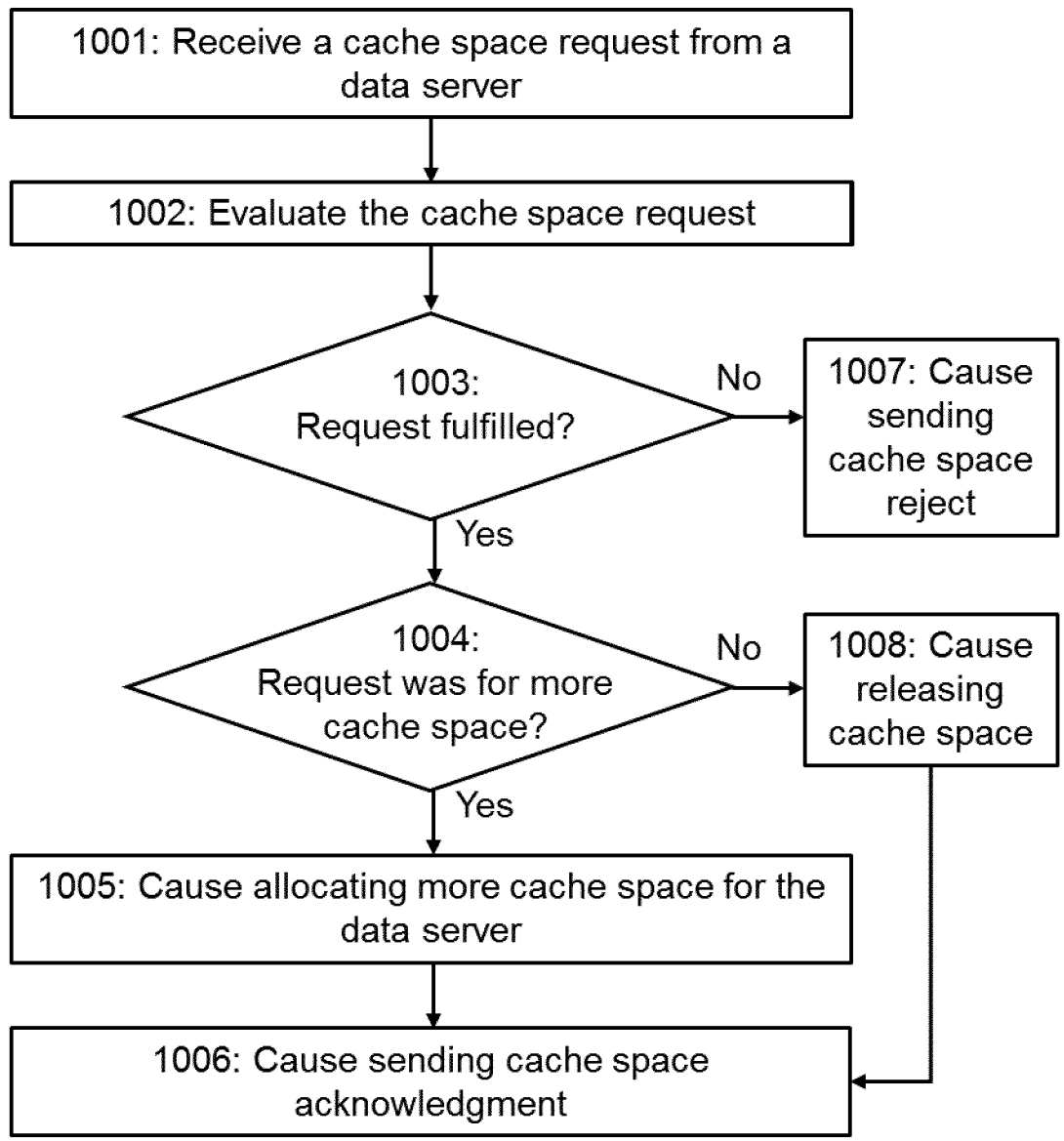

Referring to FIG. 10, the CCU receives, in block 1001, a cache space request from a data server. In response to the receiving, the CCU evaluates, in block 1002, the cache space request based on the information comprised in the cache space request (at least the amount of requested cache space or the cache space requested to be released) and information on the cache server (at least the cache space availability). When additional cache space is requested, the CCU may estimate, in block 1002, in addition to the simple comparison of how much space is requested and how much is available, how large the need for the cache space is based on the information provided in the cache space request compared to other cache space requests which have been received previously. When the request is for releasing cache space, the CCU may estimate how beneficial releasing the space is for the cache server. For example, if there is plenty of free space in the cache server, releasing the space may not be necessary and larger benefit may be gained from not releasing the requested cache space. In some embodiments, requests for releasing cache space may be automatically approved without the evaluation of blocks 1002 and 1003. The CCU may also take into account (for either of the cache space request types) how much cache space is currently allocated for the data server compared to the other data servers. In some embodiments, a pre-defined threshold may be defined for the maximum cache space that may be allocated for a single data server. The cache space allocated initially during handshaking may serve as a lower threshold for the amount of space allocated for a data server or a separate lower threshold may be defined.

If the CCU determines, in block 1003, that the request may not be satisfied, the CCU causes, in block 1007, sending a cache space reject to the data server. If the request is approved based on the evaluating (block 1003) and the request was for more cache space (block 1004), the CCU causes, in block 1005, allocating more cache space for the data server and causes, in block 1006, sending a cache space acknowledgment to the data server. If the request is approved based on the evaluating (block 1003) and the request was for less cache space (block 1004), the CCU causes, in block 1008, releasing cache space for the data server and also causes, in block 1006, sending a cache space acknowledgment to the data server. The cache space request may be satisfied in full or only in part.

Figure 11:
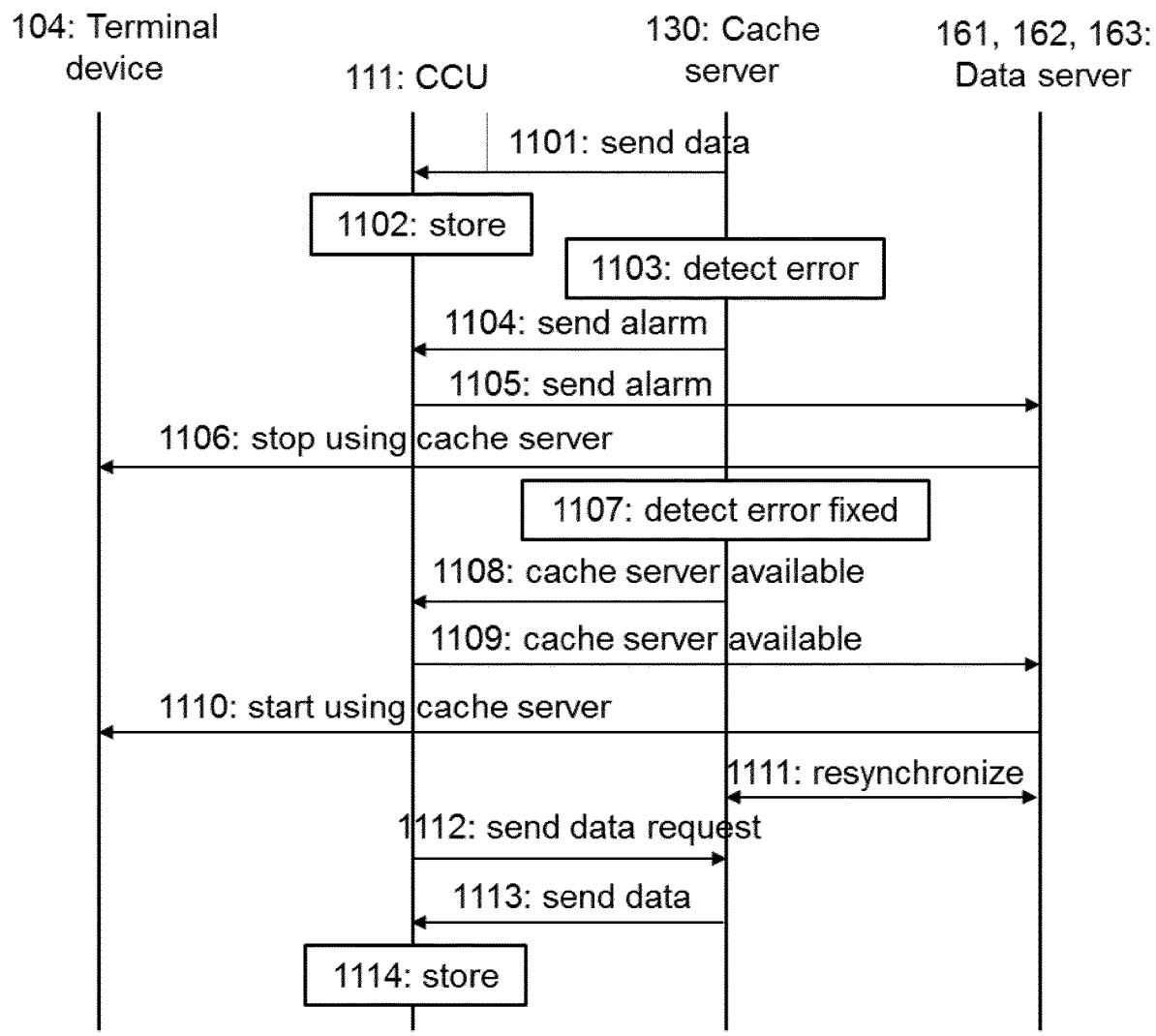

As described in FIG. 1, the CCU is connected to the cache server via the second interface. The cache server may use the second interface to report total space of the cache server, health status, quotation usage statistics of each data server and other necessary cache server data to the CCU. Such reporting may be periodical or event-based (e.g., reporting every time a new data server is allowed to use the cache server). FIG. 11 illustrates different interworking processes involving the second interface as well as the CCU, the cache server, the data servers and the terminal devices according to embodiments of the invention.

Referring to FIG. 11, the cache server causes sending a monitoring report to the CCU in message 1101. Upon receiving the monitoring report, the CCU stores, in block 1102, the data comprised in the report to a memory. The data may be used by the CCU in various decision making processes relating to the embodiments of the invention, for example, in deciding how much space to allocate for a candidate data server (block 313 of FIG. 3), in deciding which data server should be removed from the white list (block 402 of FIG. 4) or in estimating a cache space request (block 1002 of FIG. 10).

In the illustrated example, the cache server then detects, in block 1103, a server health related problem which prevents the data servers from using the cache server. In response to the detection of the problem, the cache server causes sending an alarm (message 1104) to the CCU.

Upon receiving the alarm, the CCU causes sending a similar alarm (message 1105) to data servers in the white list (of which only one is illustrated in FIG. 11).

Upon receiving the alarm, each data server in white list causes sending a message 1106 to all the terminal devices which are accessing data in the cache server (instead of the data server) requesting them to stop using the cache server.

Once the cache server detects, in block 1107, that the error has been fixed and the cache server is functioning correctly again, the cache server causes sending a message 1108 to the CCU informing the CCU that normal operation has been.

Upon receiving the message, the CCU causes sending a message 1109 to the data servers in the white list which, in turn, inform in message 1110 the terminal devices which had been using the cache server previously to start using the cache server again. As the data stored to the data servers in the white list may have changed during the time that the cache server was inoperative, the data servers in the white list may also resynchronize (messages 1111) their data with the cache server.

Finally, it is demonstrated in the example of FIG. 11 that the CCU may also request data from the cache server. The CCU causes sending a data request (message 1112) to the cache server. The requested data may comprise, for example, information on total space of the cache server, health status and/or quotation usage statistics of each data server. Upon receiving the request, the cache server causes sending the requested data (message 1113) to the CCU which stores, in block 1114, the data to the memory.

The blocks, related functions, and information exchanges described above by means of FIGS. 2 to 11 are in no absolute chronological order, and some of them may be performed simultaneously or in an order differing from the given one.

Figure 12:
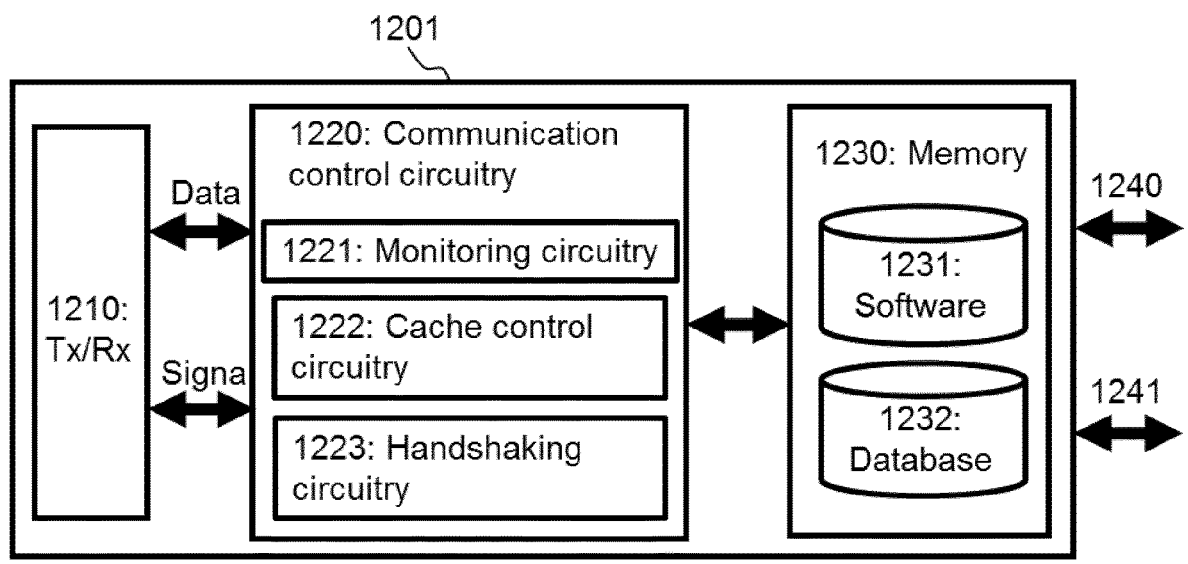
FIGS. 12 to 13 illustrate exemplary apparatuses according to embodiments of the invention.

FIG. 12 illustrates an exemplary apparatus 1201 configured to carry out the functions described above in connection with the CCU 111. The apparatus may be an electronic device comprising electronic circuitries. The apparatus may be comprised in or connected to the gateway node 110, the cache server 130, the serving node 120 or an access node 151, 152, 153. The apparatus may be a separate network entity or a plurality of separate entities. The apparatus may comprise a communication control circuitry 1210 such as at least one processor, and at least one memory 1230 including a computer program code (software) 1231 wherein the at least one memory and the computer program code (software) are configured, with the at least one processor, to cause the apparatus to carry out any one of the embodiments of the CCU described above.

The memory 1230 may be implemented using any suitable data storage technology, such as semiconductor based memory devices, flash memory, magnetic memory devices and systems, optical memory devices and systems, fixed memory and removable memory. The memory may comprise a database 1232 which may comprise a white list and a black list comprising information on the data servers allowed and not allowed or unable to use the cache server as described in previous embodiments. The database 1232 may further comprise monitoring data related to data traffic to and from the data servers and to and from the cache server and cache server status data. The memory 1230 may be connected to the communication control circuitry 1220 via an interface.

The apparatus may further comprise a communication interface (Tx/Rx) 1210 comprising hardware and/or software for realizing communication connectivity according to one or more communication protocols. The communication interface may provide the apparatus with communication capabilities to communicate in the cellular communication system and enable communication with network nodes and terminal devices, for example. The communication interface 1210 may comprise standard well-known components such as an amplifier, filter, frequency-converter, (de)modulator, and encoder/decoder circuitries and one or more antennas. The apparatus may further comprise a first interface 1240 and a second interface 1241 for communication with data servers in an external packet data network and a cache server, respectively.

Referring to FIG. 12, the communication control circuitry 1220 may comprise monitoring circuitry 1221 configured to monitor the data traffic over the first interface 1240. The monitoring circuitry 1221 may be configured to carry out block 202 of FIG. 2 and block 302 of FIG. 3. The communication control circuitry 1220 further comprises a cache control circuitry 1222 configured control, manage and maintain the cache server using the second interface 1241. The cache control circuitry 1222 is also configured to receive and request monitoring updates and/or alarms via the second interface from the cache server. The cache control circuitry 1222 may be configured to carry out blocks 313 to 315 of FIG. 3, blocks 401 and 405 of FIG. 4, steps 602, 608 and 610 of FIG. 6, blocks 1002 to 1005 and 1008 of FIG. 10 and/or steps 1102, 1111 and 1113. The communication control circuitry 1220 also comprises a handshaking circuitry 1223 configured to communicate with the data servers and enable the use of the cache server for data servers as well as to maintain and update the white and the black lists based on the monitoring data. The handshaking circuitry 1223 may be configured to carry out all the blocks of FIG. 2 excluding block 202, blocks 301 and 303 to 312 of FIG. 3, blocks 402 to 404 and 406 of FIG. 4, steps 601, 604, 607, 609 and 613 of FIG. 6 and/or blocks 1001, 1006 and 1007 of FIG. 10.

Figure 13:
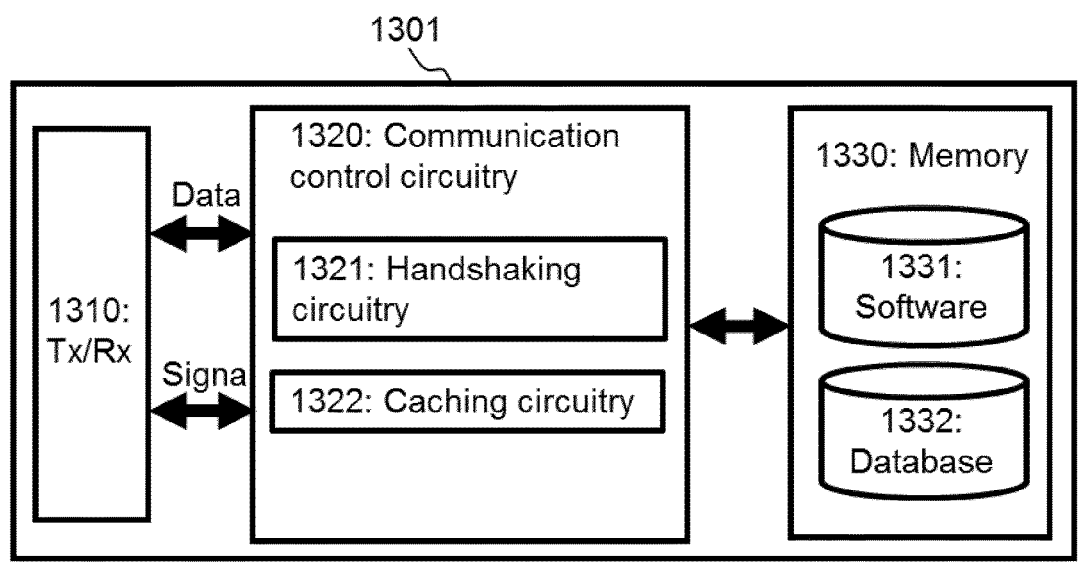

FIG. 13 illustrates an exemplary apparatus 1301 configured to carry out the functions described above in connection with the data servers 161, 162, 163, 164. Specifically, the apparatus is configured to carry out the functions described above for a data server which supports the handshake protocol and is therefore able to use a cache server for caching its data. The apparatus may be an electronic device comprising electronic circuitries. The apparatus may be a separate network entity or a plurality of separate entities. The apparatus may comprise a communication control circuitry 1310 such as at least one processor, and at least one memory 1330 including a computer program code (software) 1331 wherein the at least one memory and the computer program code (software) are configured, with the at least one processor, to cause the apparatus to carry out any one of the embodiments of the CCU described above.

The memory 1330 may be implemented using any suitable data storage technology, such as semiconductor based memory devices, flash memory, magnetic memory devices and systems, optical memory devices and systems, fixed memory and removable memory. The memory may comprise a database 1332 which may comprise a cache server list. The cache server list comprises information on all the cache servers which have "shaken hands" with the data server, that is, all the cache servers which may be used by the data server. The database may further comprise information on data traffic to and from the apparatus. The memory 1330 may be connected to the communication control circuitry 1320 via an interface.

The apparatus may further comprise a communication interface (Tx/Rx) 1310 comprising hardware and/or software for realizing communication connectivity according to one or more communication protocols. The communication interface may provide the apparatus with communication capabilities to communicate in the communication system and enable communication with other data server, for example. The communication interface 1310 may comprise standard well-known components such as an amplifier, filter, frequency-converter, (de)modulator, and encoder/decoder circuitries and one or more antennas.

Referring to FIG. 13, the communication control circuitry 1320 may comprise a handshaking circuitry 1321 configured to communicate with the CCU and enable the use of cache servers of the cellular packet data network for the data server. The handshaking circuitry may also be configured to maintain and update the cache server list. The handshaking circuitry 1321 may be configured to carry out blocks 501 to 504 and 506 of FIG. 5, steps 605 and 606 of FIG. 6 and blocks 701, 704 and 705 of FIG. 7. The communication control circuitry 1320 may further comprise a caching circuitry 1322 configured to decide which data to cache, where to cache said data and when to release cached data. The cache circuitry 1322 may also be configured to communicate with the terminal devices related to caching functions. The cache circuitry 1322 may be configured to carry out block 505 of FIG. 5, block 614 to 618 of FIG. 6, blocks 702 and 703 of FIG. 7, all blocks of FIGS. 8 and 9 and step 1106 and 1110 of FIG. 11.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 11 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 11 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 11 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art. To give an example, the functions of a CCU as described in FIGS. 2 to 4, 6 and/or 10 can be implemented as software such that the CCU may be integrated into the cache server(s), the gateway node(s) (e.g., P-GW) and/or serving node(s) (e.g., S-GW). Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
maintaining in a memory, by a cache control unit in a first packet data network, a white list of data servers in a second packet data network that are allowed to use a cache server in the first packet data network, and a black list of data servers in the second packet data network that are unable to use the cache server;
monitoring, by the cache control unit, data traffic to and from data servers in the second packet data network over an interface between the first packet data network and the second packet data network;
selecting, by the cache control unit, a pre-defined number of data servers as candidates for using the cache server based on one or more statistical properties of the monitored data traffic;
comparing, by the cache control unit, the candidate data servers to the data servers in the white list and in the black list; and
in response to a candidate data server being neither in the white list nor in the black list, performing the following
causing, by the cache control unit, sending a cache request to the candidate data server and
in response to receiving an acknowledgement to the cache request from the candidate data server within a pre-defined time, adding, by the cache control unit, the candidate data server to the white list, otherwise adding, by the cache control unit, the candidate data server to the black list.

2. A method according to claim 1, wherein the cache request comprises at least information on the cache server and routing information, the information on the cache server comprising at least one of an IP address of the cache server, an IP address of the cache control unit, caching data type, file path information and a cache space quotation, the routing information comprising at least an IP prefix list of IP4 and/or IP6 prefixes associated with the cache server; and
the white list and the black list comprise at least IP addresses of data servers in the corresponding list.

3. A method according to claim 1, further comprising:
in response to the candidate data server being neither in the white list nor in the black list, causing allocating, by the cache control unit, cache space for the candidate data server;
in response to adding the candidate data server to the white list, causing, by the cache control unit, sending a cache allocation confirmation to the cache server; and
in response to adding the candidate data server to the black list, causing, by the cache control unit, releasing the cache space allocated for the candidate.

4. A method according to claim 1, wherein when the cache request comprises information indicating that access information is needed to access the cache server, the method further comprises:
generating, by the cache control unit, access information for the data server, wherein the access information comprises one or more user name and password pairs, one or more access tokens or any other information relating to an access control mechanism;

causing, by the cache control unit, sending access settings of the data server to the cache server, wherein the access settings comprise the access information and an IP address of the data server;

receiving, by the cache control unit, an acknowledgment from the cache server; and causing, by the cache control unit, sending the access information to the data server.

5. A method according to claim 4, further comprising:

receiving, by the cache control unit, updates from the cache server regarding data traffic to and from the cache server and accessing of cached data corresponding to each data server in the white list;

detecting, by the cache control unit, a cached data popularity metric for one or more data servers falling below a pre-defined value based on the received updates, wherein the cached data popularity metric for a data server relates to at least one of the following: number of times data cached by the data server is accessed within a pre-defined time or traffic volume caused by data cached by the data server;

causing, by the cache control unit, sending a cache release request to the one or more data servers;

in response to receiving a cache release acknowledgment from the one or more data servers, causing, by the cache control unit, releasing cache space allocated for the one or more data servers in the cache server; and removing, by the cache control unit, the one or more data servers from the white list.

6. A method according to claim 1, further comprising receiving, by the cache control unit, from the data server a cache space request comprising at least information on how much additional space is requested by the data server;

evaluating, by the cache control unit, the cache space request based on at least cache space availability in the cache server; and if enough space is available in the cache server based on the evaluating, causing, by the cache control unit, allocating additional cache space for the data server and sending a cache space acknowledgment to the data server, otherwise causing, by the cache control unit, sending a cache space reject to the data server.

7. A method according to claim 1, further comprising receiving, by the cache control unit, from the data server a cache space request comprising at least information on how much space allocated to the data server is requested to be released;

evaluating, by the cache control unit, the cache space request based on at least cache space availability in the cache server; and if releasing cache space is beneficial for the cache server based on the evaluating, causing, by the cache control unit, releasing cache space allocated for the data server and sending a cache space acknowledgment to the data server, otherwise causing, by the cache control unit, sending a cache space reject to the data server.

8. An apparatus, comprising:

at least one processor, and at least one memory comprising a computer program code, wherein the processor, the memory, and the computer program code are configured to cause the apparatus to perform a method according to claim 1.

9. The apparatus according to claim 8, wherein the apparatus is a cache control unit comprised in or connected to one of the following: a gateway in the first packet data network supporting the interface between the first packet data network and the second packet data network and the cache server.

10. A non-transitory computer readable medium having stored thereon instructions that, when executed by a computing device, cause the computing device to perform a method according to claim 1.

11. A system, comprising: one or more first packet data networks, a first packet data network comprising one or more cache servers and at least one cache control unit controlling at least one of the one or more cache servers, the cache control unit being configured to perform a method according claim 1; and one or more second packet data networks, connected to at least one of the one or more first packet data networks over a first interface, a second packet data network comprising at least one data server configured to perform a method comprising maintaining, by a data server in the second packet data network, a cache server list in a memory, wherein the cache server list comprises at least following information for each cache server in the cache server list: information on the cache server and routing information, the information on the cache server comprising at least one of an IP address of the cache server, an IP address of a cache control unit corresponding to the cache server, caching data type, file path information and a cache space quotation, the routing information comprising at least an IP prefix list of IP4 and/or IP6 prefixes associated with the cache server;

receiving, by the data server, a cache request from a cache control unit in the first packet data network, wherein the cache request comprises at least information on the cache server and routing information, the information on the cache server comprising at least one of an IP address of the cache server, an IP address of the cache control unit, caching data type, file path information and a cache space quotation, the routing information comprising at least an IP prefix list of IP4 and/or IP6 prefixes associated with the cache server;

adding, by the data server, information received in the cache request relating to the cache server and an IP address of the cache control unit to the cache server list;

causing, by the data server, sending a cache request acknowledgment to the cache control unit in the first packet data network; and synchronizing, by the data server, data in the data server to the cache server;

detecting, by the data server, a need for additional cache space in a cache server or a possibility for releasing cache space allocated for the data server;

causing, by the data server, sending a cache space request to a cache control unit relating to the cache server, wherein the cache space request comprises, if the need for additional cache space was detected, information on how much additional space is requested by the data server or if the possibility for releasing cache space allocated for the data server was detected, information on how much space allocated to the data server is requested to be released; and if the need for additional cache space was detected, in response to receiving a cache space acknowledgment from the cache control unit, causing, by the data server, caching more data.

12. A method comprising:
maintaining, by a data server in a second packet data network, a cache server list in a memory, wherein the cache server list comprises at least following information for each cache server in the cache server list: information on the cache server and routing information, the information on the cache server comprising at least one of an IP address of the cache server, an IP address of a cache control unit corresponding to the cache server, caching data type, file path information and a cache space quotation, the routing information comprising at least an IP prefix list of IP4 and/or IP6 prefixes associated with the cache server;
receiving, by the data server, a cache request from a cache control unit in the first packet data network, wherein the cache request comprises at least information on the cache server and routing information, the information on the cache server comprising at least one of an IP address of the cache server, an IP address of the cache control unit, caching data type, file path information and a cache space quotation, the routing information comprising at least an IP prefix list of IP4 and/or IP6 prefixes associated with the cache server;
adding, by the data server, information received in the cache request relating to the cache server and an IP address of the cache control unit to the cache server list;
causing, by the data server, sending a cache request acknowledgment to the cache control unit in the first packet data network; and
synchronizing, by the data server, data in the data server to the cache server;
detecting, by the data server, a need for additional cache space in a cache server or a possibility for releasing cache space allocated for the data server;
causing, by the data server, sending a cache space request to a cache control unit relating to the cache server, wherein the cache space request comprises, if the need for additional cache space was detected, information on how much additional space is requested by the data server or if the possibility for releasing cache space allocated for the data server was detected, information on how much space allocated to the data server is requested to be released; and
if the need for additional cache space was detected, in response to receiving a cache space acknowledgment from the cache control unit, causing, by the data server, caching more data.

13. An apparatus, comprising:
at least one processor, and
at least one memory comprising a computer program code, wherein the processor, the memory, and the computer program code are configured to cause the apparatus to perform a method according to claim 12.

14. A non-transitory computer readable medium having stored thereon instructions that, when executed by a computing device, cause the computing device to perform a method according to claim 12.

* * * * *